US012498287B2

United States Patent
Alerwi et al.

(10) Patent No.: US 12,498,287 B2
(45) Date of Patent: Dec. 16, 2025

(54) INSPECTING A PIPELINE WITH AN UNMANNED AERIAL VEHICLE

(71) Applicant: Saudi Arabian Oil Company, Dhahran (SA)

(72) Inventors: Maher Hamed Alerwi, Dhahran (SA); Ghazi Salman Qahtani, Khobar (SA); Layan Alaeddin AlSharif, Dhahran (SA); Rahaf Nasser Almutairi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 67 days.

(21) Appl. No.: 18/459,990

(22) Filed: Sep. 1, 2023

(65) Prior Publication Data
US 2025/0076145 A1 Mar. 6, 2025

(51) Int. Cl.
*G05D 1/689* (2024.01)
*G01M 3/04* (2006.01)
(Continued)

(52) U.S. Cl.
CPC ............ *G01M 3/04* (2013.01); *G05D 1/0094* (2013.01); *G05D 1/104* (2013.01); *G05D 1/485* (2024.01);
(Continued)

(58) Field of Classification Search
CPC ...... G05D 1/0094; G05D 1/104; G05D 1/689; G05D 1/69; G05D 2105/45;
(Continued)

(56) References Cited

U.S. PATENT DOCUMENTS

| 7,411,196 B2 * | 8/2008 | Kalayeh .................. G01S 17/89 250/342 |
| 10,031,529 B2 | 7/2018 | Mullan et al. |

(Continued)

FOREIGN PATENT DOCUMENTS

| CN | 108603790 | 9/2020 |
| KR | 20180036299 | 4/2018 |
| WO | WO-2024047907 A1 * | 3/2024 |

OTHER PUBLICATIONS

WO 2024047907 A1—machine translation (Year: 2024).*
(Continued)

*Primary Examiner* — Dino Kujundzic
(74) *Attorney, Agent, or Firm* — Fish & Richardson P.C.

(57) ABSTRACT

A pipeline inspection system includes an unmanned aerial vehicle (UAV) operable to travel in an airspace above a pipeline configured to transport a hydrocarbon fluid. The UAV includes sensors configured to detect a leak of the hydrocarbon fluid from the pipeline. The system includes a control system configured to perform operations including operating the UAV to travel at a first altitude range in the airspace, identifying a measurement, taken at the first altitude range, from a first sensor that indicates a location of a potential leak of the hydrocarbon fluid, based on the identified measurement from the first sensor, operating the UAV to travel at a second altitude range different from the first altitude range in the airspace, identifying a measurement, taken at the second altitude range, from a second sensor that indicates the location of the potential leak, and generating a recommended action based on the identified measurements.

21 Claims, 4 Drawing Sheets

(51) Int. Cl.
  *G05D 1/00* (2006.01)
  *G05D 1/485* (2024.01)
  *B64U 10/14* (2023.01)
  *B64U 101/26* (2023.01)
  *B64U 101/30* (2023.01)
  *G05D 105/80* (2024.01)

(52) U.S. Cl.
  CPC ............. *G05D 1/689* (2024.01); *B64U 10/14* (2023.01); *B64U 2101/26* (2023.01); *B64U 2101/30* (2023.01); *G05D 2105/89* (2024.01)

(58) Field of Classification Search
  CPC ............ G05D 2105/89; B64U 2101/26; B64U 2101/30; G01M 3/04
  See application file for complete search history.

(56) References Cited

U.S. PATENT DOCUMENTS

| | | | |
|---|---|---|---|
| 10,094,773 B2* | 10/2018 | Myshak | G01J 3/0208 |
| 10,203,311 B2 | 2/2019 | Risk et al. | |
| 2004/0263852 A1* | 12/2004 | Degtiarev | G01N 21/39 356/437 |
| 2018/0292286 A1* | 10/2018 | Dittberner | G05D 1/106 |
| 2019/0169982 A1 | 6/2019 | Hauge et al. | |
| 2019/0205644 A1* | 7/2019 | Birchbauer | G05D 1/0094 |
| 2020/0232963 A1 | 7/2020 | Zelinski | |
| 2021/0065563 A1* | 3/2021 | Bauer | G05D 1/0038 |
| 2021/0231518 A1 | 7/2021 | Pawlyk | |
| 2024/0419177 A1* | 12/2024 | Sharon | B64U 80/00 |

OTHER PUBLICATIONS

Adamchuk et al., "On-the-go soil sensors for precision agriculture," Computers and Electronics in Agriculture, Jul. 2004, 44(1):71-91, 21 pages.

Alharam et al., "Real time AI-based pipeline inspection using drone for oil and gas industries in Bahrain," Proceedings of the 2020 International Conference on Innovation and Intelligence for Informatics, Computing and Technologies, Dec. 20-21, 2020, 5 pages.

Asadzadeh et al., "UAV-based remote sensing for the petroleum industry and environmental monitoring: State-of-the-art and perspectives," Journal of Petroleum Science and Engineering, Jan. 2022, 208: 1-14, 14 pages.

Colomina et al., " Unmanned aerial systems for photogrammetry and remote sensing: A review," ISPRS Journal of Photogrammetry and Remote Sensing, Jun. 2014, 92:79-97, 19 pages.

Fingas et al., "Review of oil spill remote sensing," Spill Science & Technology Bulletin, 1997, 4(4):199-208, 10 pages.

Montes-Grova et al., "Multi-Sensor System for Pipe Inspection using an Autonomous Hybrid Aerial Robot," International Conference on Unmanned Aircraft Systems (ICUAS), Jun. 21, 2022, 1367-1374, 8 pages.

Pajares, "Overview and Current Status of Remote Sensing Applications Based on Unmanned Aerial Vehicles (UAVs)," Photogrammetric Engineering & Remote Sensing, Apr. 2015, 81(4):281-329, 49 pages.

Pobkrut et al., "Soil sensing survey robots based on electronic nose," 14th International Conference on Control, Automation and Systems in KINTEX, Gyeonggi-do, Korea, Oct. 22-25, 2014, 1604-1609, 6 pages.

Rashid et al., " Optimized inspection of upstream oil and gas methane emissions using airborne LiDAR surveillance," Applied Energy, Oct. 1, 2020, 275:1-8, 8 pages.

Ravishankar et al., "DARTS—Drone and Artificial Intelligence Reconsolidated Technological Solution for Increasing the Oil and Gas Pipeline Resilience," International Journal of Disaster Risk Science, Sep. 26, 2022, 13:810-821, 12 pages.

Sehrawat et al., "Smart Sensors: Analysis of Different Types of IoT Sensors," Proceedings of the Third International Conference on Trends in Electronics and Informatics, Apr. 23-25, 2019, 523-528, 6 pages.

* cited by examiner

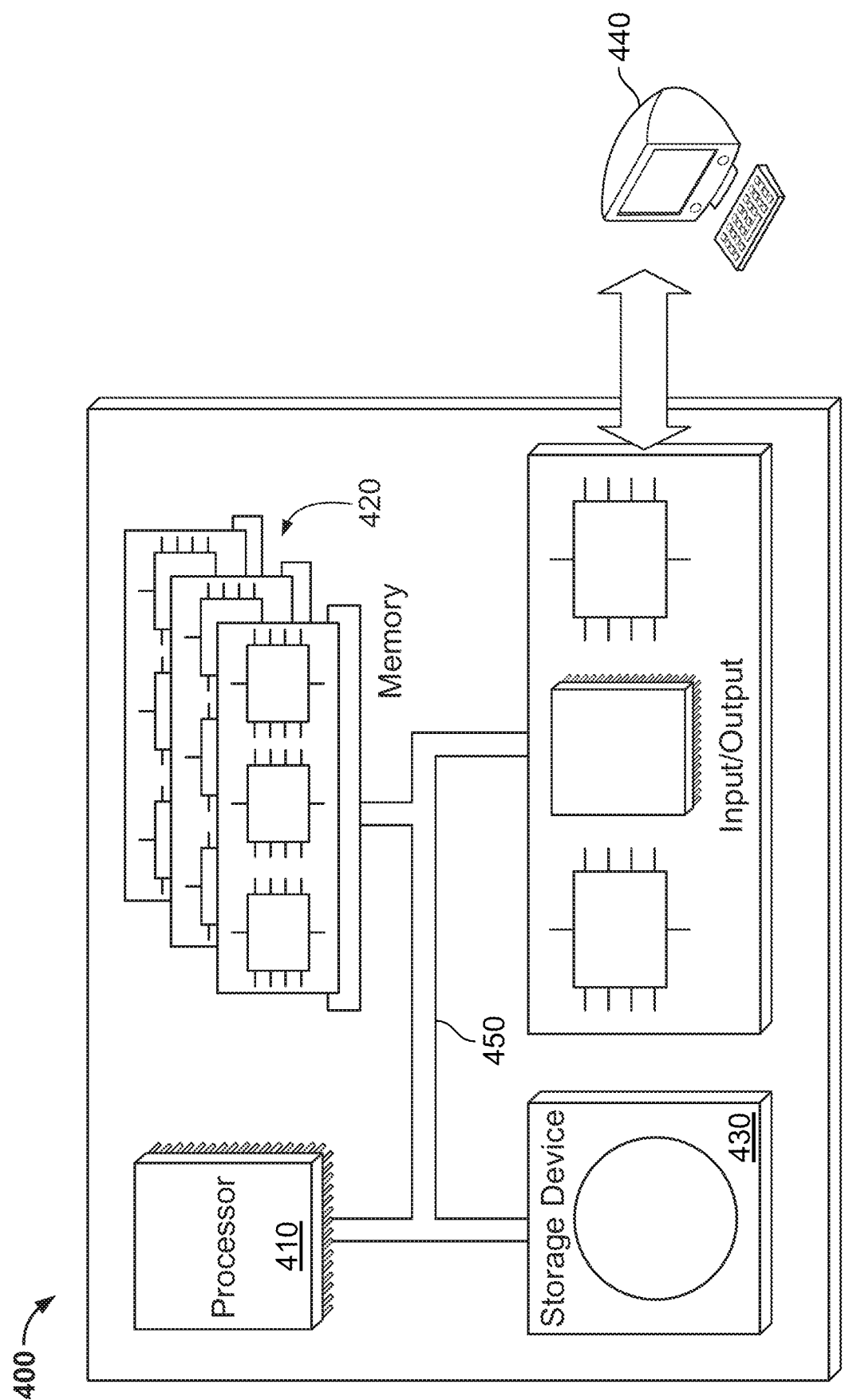

INSPECTING A PIPELINE WITH AN UNMANNED AERIAL VEHICLE

TECHNICAL FIELD

This disclosure relates to apparatus, systems, and methods for inspecting a pipeline, such as a hydrocarbon pipeline, with one or more unmanned aerial vehicles (UAVs).

BACKGROUND

Pipelines are often used to transport or transfer fluids (for example, liquids, gasses, or mixed-phase fluids) across land, under land, or through a body of water. In some aspects, pipelines develop leaks or other problems, which would desirably be discovered as quickly as possible. Due to, for example, the remoteness or locations of such pipelines, expedient discovery of such problems is difficult.

SUMMARY

In an example implementation, a pipeline inspection system includes at least one unmanned aerial vehicle (UAV) operable to travel in an airspace above a pipeline configured to transport a hydrocarbon fluid. The at least one UAV includes at least one power source configured to provide power to the at least on UAV, a plurality of sensors configured to detect a leak of the hydrocarbon fluid from the pipeline, and a communication module. The system includes a control system communicably coupled with the communication module of the at least one UAV and configured to perform operations including operating the at least one UAV to travel at a first altitude range in the airspace above the pipeline, identifying a measurement, taken at the first altitude range, from a first sensor of the plurality of sensors that indicates a location of a potential leak of the hydrocarbon fluid from the pipeline, based on the identified measurement from the first sensor, operating the at least one UAV to travel at a second altitude range different from the first altitude range in the airspace above the pipeline, identifying a measurement, taken at the second altitude range, from a second sensor of the plurality of sensors that indicates the location of the potential leak of the hydrocarbon fluid from the pipeline, and generating a recommended action based on at least one of the identified measurement from the first or second sensors.

In an aspect combinable with the example implementation, the second altitude range is lower than the first altitude range.

In another aspect combinable with any of the previous aspects, the first sensor includes at least one of a high-definition camera or a laser gas sniffer, and the second sensor includes an infrared camera.

In another aspect combinable with any of the previous aspects, the operations further include based on the identified measurement from the second sensor, operating the at least one UAV to travel at a third altitude range different from the first and second altitude ranges in the airspace above the pipeline, identifying a measurement, taken at the third altitude range, from a third sensor of the plurality of sensors that indicates the location of the potential leak of the hydrocarbon fluid from the pipeline, and generating the recommended action based on at least one of the identified measurement from the first, second, or third sensors.

In another aspect combinable with any of the previous aspects, the third altitude range is lower than the first and second altitude ranges.

In another aspect combinable with any of the previous aspects, the first sensor includes at least one of a high-definition camera or a laser gas sniffer, the second sensor includes an infrared camera, and the third sensor includes a LiDAR sensor.

In another aspect combinable with any of the previous aspects, the operations further include based on the identified measurement from the second or third sensors, operating the at least one UAV to travel at the third altitude range, identifying a measurement, taken at the third altitude range, from a fourth sensor of the plurality of sensors that indicates the location of the potential leak of the hydrocarbon fluid from the pipeline, and generating the recommended action based on at least one of the identified measurement from the first, second, third, or fourth sensors.

In another aspect combinable with any of the previous aspects, the operation of generating the recommended action based on at least one of the identified measurement from the first, second, third, or fourth sensors includes at least one of adjusting the at least one UAV from the first altitude range to the second altitude range based on the identified measurement from the first sensor, generating an alert associated with the location of the potential leak of the hydrocarbon fluid and adjusting the at least one UAV from the second altitude range to the third altitude range based on the identified measurement from the second sensor, geolocating the location of the potential leak of the hydrocarbon fluid based on the identified measurement from the third sensor, or determining a presence of leaked hydrocarbons at the location based on the identified measurement from the fourth sensor.

In another aspect combinable with any of the previous aspects, the at least one UAV includes a first UAV and a second UAV, and the operations further include operating the first UAV to travel at the first altitude range in the airspace above the pipeline, identifying a measurement, taken at the first altitude range, from a first sensor of the plurality of sensors of the first UAV that indicates a first location of a potential leak of the hydrocarbon fluid from the pipeline, operating the second UAV to travel at the second altitude range different from the first altitude range in the airspace above the pipeline, identifying a measurement, taken at the second altitude range, from a second sensor of the plurality of sensors of the second UAV that indicates a second location of the potential leak of the hydrocarbon fluid from the pipeline, and operating at least one of the first or second UAVs to reconcile the first and second locations.

In another aspect combinable with any of the previous aspects, the operation of operating at least one of the first or second UAVs to reconcile the first and second locations includes operating at least one of the first or second UAVs to travel at the third altitude range above the pipeline, and identifying a measurement, taken at the third altitude range, from a third sensor of the plurality of sensors that indicates the location of the potential leak of the hydrocarbon fluid from the pipeline of the first or second locations.

In another example implementation, a pipeline inspection method includes operating at least one unmanned aerial vehicle (UAV) in an airspace above a pipeline configured to transport a hydrocarbon fluid. The at least one UAV includes at least one power source configured to provide power to the at least on UAV, and a plurality of sensors configured to detect a leak of the hydrocarbon fluid from the pipeline. The method includes commanding the at least one UAV to travel at a first altitude range in the airspace above the pipeline; identifying a measurement, taken at the first altitude range, from a first sensor of the plurality of sensors that indicates a location of a potential leak of the hydrocarbon fluid from the pipeline; based on the identified measurement from the first sensor, commanding the at least one UAV to travel at a second altitude range different from the first altitude range in the airspace above the pipeline; identifying a measurement, taken at the second altitude range, from a second sensor of the plurality of sensors that indicates the location of the potential leak of the hydrocarbon fluid from the pipeline; and generating a recommended action based on at least one of the identified measurement from the first or second sensors.

In an aspect combinable with the example implementation, the second altitude range is lower than the first altitude range.

In another aspect combinable with any of the previous aspects, the first sensor includes at least one of a high-definition camera or a laser gas sniffer, and the second sensor includes an infrared camera.

Another aspect combinable with any of the previous aspects further include, based on the identified measurement from the second sensor, commanding the at least one UAV to travel at a third altitude range different from the first and second altitude ranges in the airspace above the pipeline; identifying a measurement, taken at the third altitude range, from a third sensor of the plurality of sensors that indicates the location of the potential leak of the hydrocarbon fluid from the pipeline; and generating the recommended action based on at least one of the identified measurement from the first, second, or third sensors.

In another aspect combinable with any of the previous aspects, the third altitude range is lower than the first and second altitude ranges.

In another aspect combinable with any of the previous aspects, the first sensor includes at least one of a high-definition camera or a laser gas sniffer, the second sensor includes an infrared camera, and the third sensor includes a LiDAR sensor.

Another aspect combinable with any of the previous aspects further includes, based on the identified measurement from the second or third sensors, commanding the at least one UAV to travel at the third altitude range; identifying a measurement, taken at the third altitude range, from a fourth sensor of the plurality of sensors that indicates the location of the potential leak of the hydrocarbon fluid from the pipeline; and generating the recommended action based on at least one of the identified measurement from the first, second, third, or fourth sensors.

In another aspect combinable with any of the previous aspects, generating the recommended action based on at least one of the identified measurement from the first, second, third, or fourth sensors includes at least one of adjusting the at least one UAV from the first altitude range to the second altitude range based on the identified measurement from the first sensor; generating an alert associated with the location of the potential leak of the hydrocarbon fluid and adjusting the at least one UAV from the second altitude range to the third altitude range based on the identified measurement from the second sensor; geolocating the location of the potential leak of the hydrocarbon fluid based on the identified measurement from the third sensor; or determining a presence of leaked hydrocarbons at the location based on the identified measurement from the fourth sensor.

In another aspect combinable with any of the previous aspects, the at least one UAV includes a first UAV and a second UAV.

Another aspect combinable with any of the previous aspects further includes commanding the first UAV to travel at the first altitude range in the airspace above the pipeline; identifying a measurement, taken at the first altitude range, from a first sensor of the plurality of sensors of the first UAV that indicates a first location of a potential leak of the hydrocarbon fluid from the pipeline; commanding the second UAV to travel at the second altitude range different from the first altitude range in the airspace above the pipeline; identifying a measurement, taken at the second altitude range, from a second sensor of the plurality of sensors of the second UAV that indicates a second location of the potential leak of the hydrocarbon fluid from the pipeline; and operating at least one of the first or second UAVs to reconcile the first and second locations.

In another aspect combinable with any of the previous aspects, operating at least one of the first or second UAVs to reconcile the first and second locations includes commanding at least one of the first or second UAVs to travel at the third altitude range above the pipeline; and identifying a measurement, taken at the third altitude range, from a third sensor of the plurality of sensors that indicates the location of the potential leak of the hydrocarbon fluid from the pipeline of the first or second locations.

Implementations of a pipeline inspection system to the present disclosure may include one or more of the following features. For example, implementations according to the present disclosure can detect hydrocarbons leakage in a multiphase pipeline due to a fluctuation of the operation parameters, where in a case of a real leakage there will not be a detectible pressure or flow drop. As another example, implementations according to the present disclosure can detect a leak along a large length of a pipeline that is even difficult to access through the use of one or more drones, which can maneuver in an airspace over a pipeline.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a schematic illustration of an example controller (or control system) for an UAV operable within a pipeline inspection system according to the present disclosure.

DETAILED DESCRIPTION

The present disclosure describes example implementations of a pipeline inspection system, such as an inspection system operable to monitor and alert one or more operators of the pipeline should there by a leak or other undesirable event. In some aspects, example implementations of a pipeline inspection system are used to inspect pipelines that circulate or otherwise transport hydrocarbon fluids, such as oil, gas, or other mixed-phase hydrocarbon fluids. However, the present disclosure also contemplates that example implementations of a pipeline inspection system can be used to monitor and analyze pipelines that transport other fluids, such as water or pressurized working fluids (such as nitrogen or hydrogen or oxygen). The inspected pipelines can be located above a terranean surface, buried (at least partially) below the terranean surface, or submerged in a body of water (such as an ocean, gulf, or otherwise).

Example implementations of pipeline inspection systems according to the present disclosure can utilize one or more UAVs—also commonly called "drones"—for pipeline inspection partly because of their maneuverability and ability to execute challenging tasks without a human present in or at the vehicle. In some aspects, UAVs in the present disclosure can include multi-sensor-based drones for autonomous pipeline leakage detection, which more accurately discover leaks (and more precise locations thereof) in more complex and rugged environments than those typically visitable by human inspections. However, conventionally, the use of drones in this manner has been accompanied by a cost of intensive computation and extensive inspection times.

Example implementations of pipeline inspection systems according to the present disclosure can include a real-time adaptive optimization framework that can be integrated with one or more multi-sensor drones. In some aspects, this framework can include multiple drone altitude ranges, which enable an efficient use of available sensors on the drone(s) to achieve an increased level (as compared to conventional systems) of leakage detection accuracy while minimizing inspection time in an airspace over a pipeline.

Figure 1:
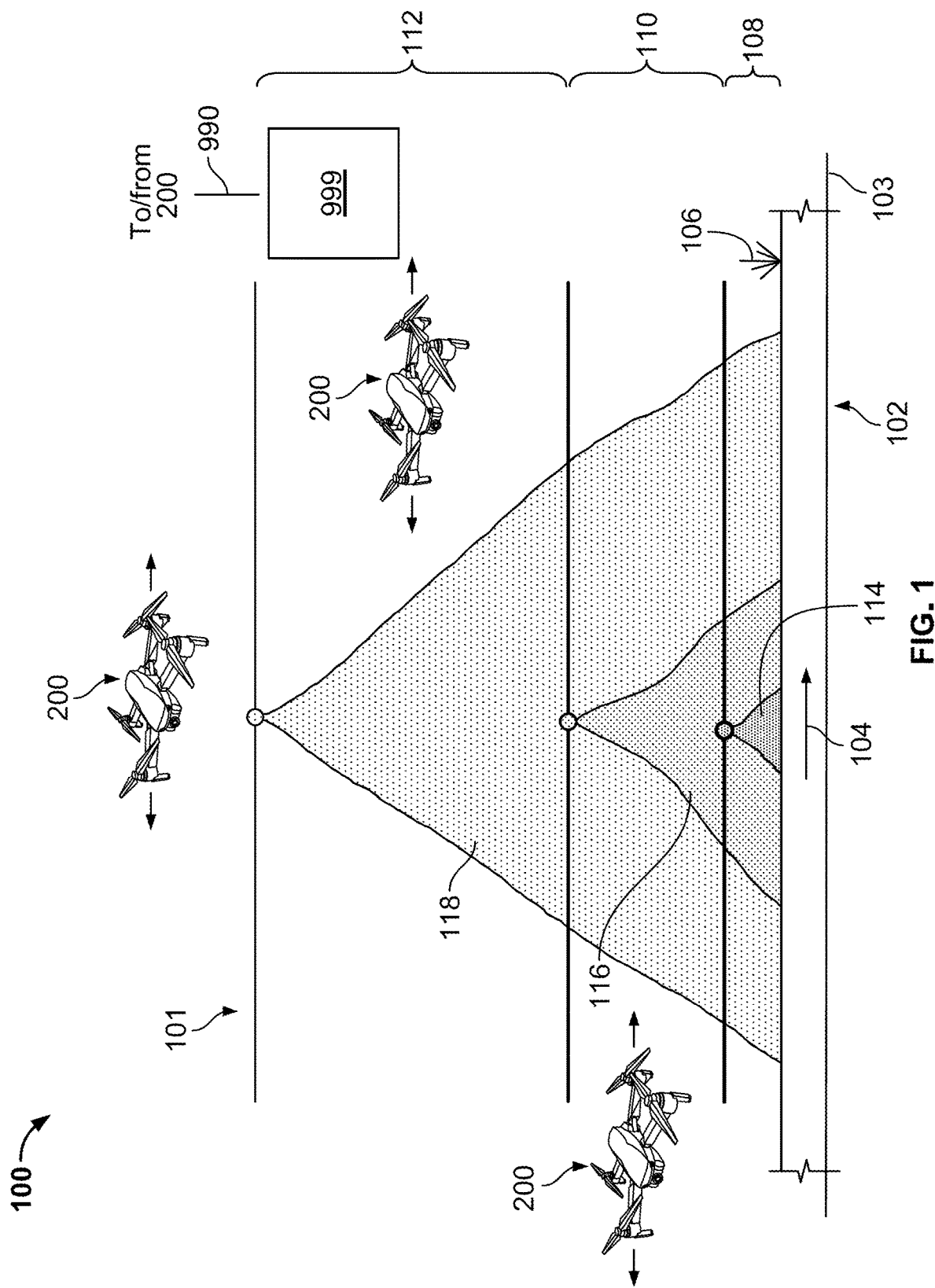
FIG. 1 is a schematic diagram of an example implementation of a pipeline inspection system according to the present disclosure.

FIG. 1 is a schematic diagram of an example implementation of a pipeline inspection system 100 according to the present disclosure. The example implementations of the pipeline inspection system 100 includes a pipeline 102 (or at least a portion thereof) that carries a fluid 104 (for example, a liquid, gas, or multi-phase fluid) between two or more locations. In this example of the pipeline inspection system 100, the fluid 104 can be a hydrocarbon fluid 104. Pipeline 102 can be positioned on a terranean surface 103; however, alternatively, at least a portion of the pipeline 102 can be positioned or buried under the terranean surface 103. Alternative implementations include the pipeline 102 that extends at least partially under a body of water, such as a lake, gulf, ocean, river, or otherwise.

The pipeline inspection system 100 utilizes one or more UAVs 200 that are operable to, and are instructed to in some aspects, travel (for example, fly) in an airspace 101 above the pipeline 102. While traveling in the airspace 101 based on commands or instructions as described herein, the one or more UAVs 200 can travel in parallel with a length of the pipeline 102, orthogonally (for example, back and forth across) to the length of the pipeline 102, or a combination thereof. Although three UAVs 200 are shown in pipeline inspection system 100, there can be fewer (including one) or more (for example, two or more) UAVs that are utilized in the pipeline inspection system 100.

Figure 2:
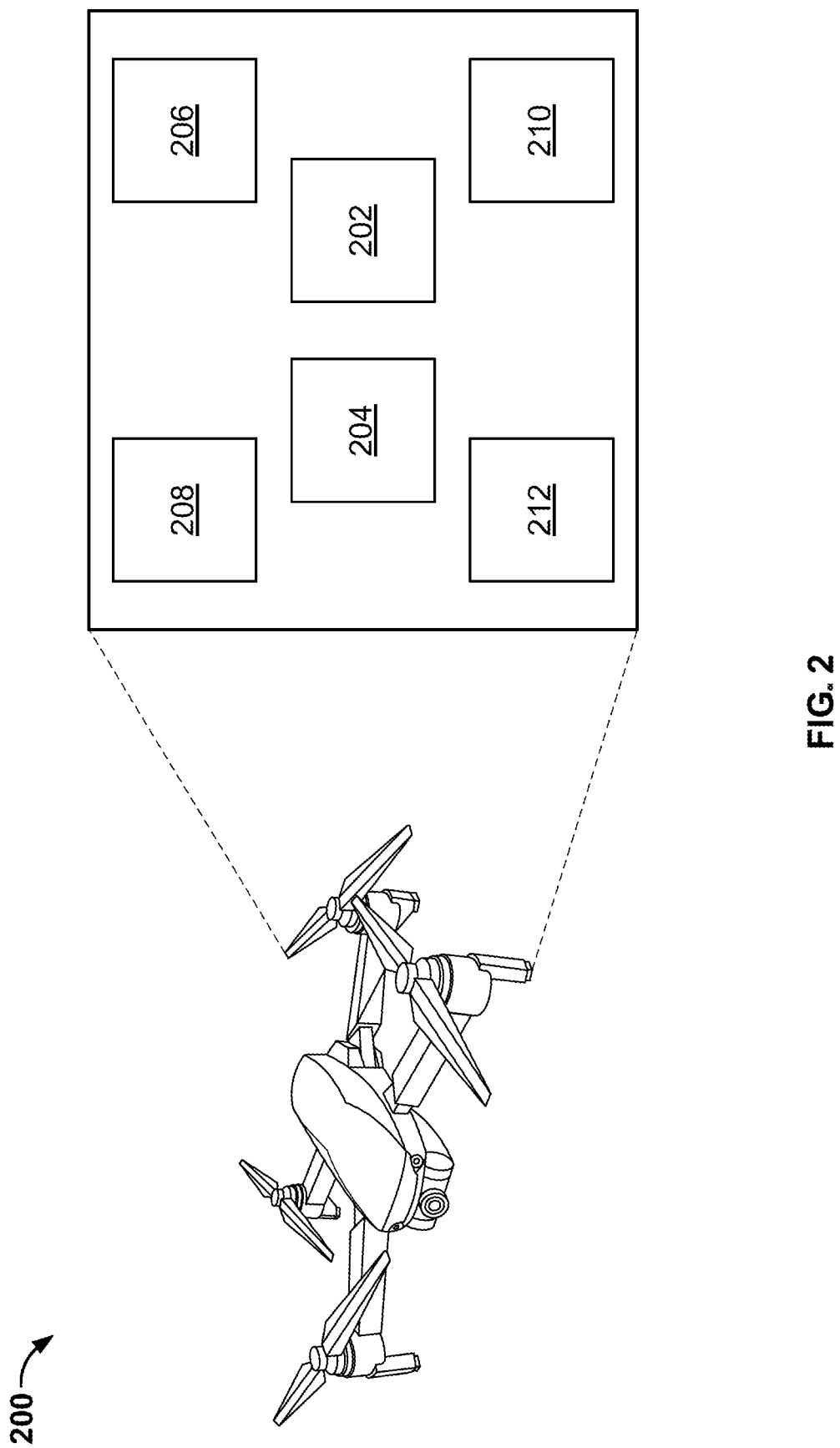
FIG. 2 is a schematic diagram of an example implementation of an unmanned aerial vehicle (UAV) operable within a pipeline inspection system according to the present disclosure.

Generally, each UAV 200 comprises a drone that is operable to fly as directed in the airspace, including fly at a particular altitude or altitude range in a constant flight pattern, move up or down between different altitudes or altitude ranges, or a combination thereof. For example, turning to FIG. 2, this figure is a schematic diagram of an example implementation of the UAV 200 operable within the pipeline inspection system 100 according to the present disclosure. This example implementation of the UAV 200 includes standard drone features (for example, multiple blade arrays that provide flight and altitude movement for the drone and a housing coupled to the blade arrays), as well as certain components operable within the pipeline inspection systems according to the present disclosure.

For example, UAV 200 includes a power source 202 that provides power (for example, electrical power) to other components and, generally, the UAV 200 for flight operations. In some aspects, the power source 202 can be a rechargeable battery. The UAV 200 in this example also includes a controller 204, such as a microprocessor or ASIC based controller that can, for instance, store instructions in a memory and execute such instructions to control the UAV 200, whether based on preset instructions or commands (for example, from a control system 999 of the pipeline inspection system 100). The UAV 200 in FIG. 2 also includes a communication module 206, which can, for example, receive data (from an external source such as the control system 999), transmit data (for example, measured or gathered by one or more on-board sensors as described herein), and provide the received data to the controller 204.

In this example, the UAV 200 also includes a global positioning sensor (GPS) module 208, which is operable to geolocate the UAV 200 in the airspace 101 and provide such data to the controller 204. Although called a GPS module 208, this module 208 can utilize any geolocation technique to determine a location (in three-dimensional space) of the UAV 200, whether stationary or moving in flight.

The UAV 200 also includes one or more hydrocarbon sensors 210. In example implementations, the hydrocarbon sensor(s) 210 can include one or more of gas sniffers or laser fluorosensors. In particular, the gas sniffers can use an active laser beam for detection of gaseous hydrocarbons. Laser fluorosensors, which are sampling instruments, can detect a presence of oil on different backgrounds while also identifying a class of the oil.

The UAV 200 also includes one or more optical sensors 212. For example, the optical sensor(s) 212 can include one or more high-definition (RGB) cameras that can acquire stationary or video images. The optical sensor(s)212 can also include a light detection and ranging (LiDAR) sensor, which can measure distances by exploring the scene with the light. LiDAR systems have been adapted for UAVs, achieving lightweight systems useful for surveillance or mapping natural and artificial structures. As another example, the optical sensor(s) 212 can also include one or more thermal infrared (IR) cameras, which record longwave infrared (LWIR) radiations and turn them into calibrated temperature image/video footage. In addition, thermal sensors can be utilized along with a visual sensor to allow for a seamless overlay of temperature data with visible imagery for visual interpretations. The optical sensor(s) 212 can include one, some, or all of these examples.

Returning to FIG. 1, as shown, the control system 999 can be remotely located (for example, remote but within communication distance of the UAV 200 depending on the communication protocol used). In example implementations, the control system 999 can be a microprocessor-based system that executes software instructions stored on tangible media to operate, command, or control the UAV 200. For example, commands/data 990 can be transmitted between the UAV(s) 200 and the control system 999. Data can include data, such as sensed or measured data, or acknowledgement of commands, sent from the UAV 200 to the control system 999. Commands can be instructions sent to the UAV 200 from the control system 999 that cause the UAV 200 to perform certain functions.

As shown in FIG. 1, each UAV 200 can travel in the airspace 101 at multiple altitude ranges 108, 110, or 112. Each altitude range 108, 110, and 112 represents a range at which the UAVs 200 can operate and use one or more hydrocarbon sensors 210 and/or one or more optical sensors 212 to detect a leak 106 of the hydrocarbon fluid 104 from the pipeline 102. As examples, altitude range 108 can be about (for example, plus or minus 5-10 feet) 0-400 ft. above the surface 103, altitude range 110 can be about 401-1200 ft. above the surface 103, and altitude range 112 can be about 1201-3600 ft. above the surface 103. In some aspects, the particular sensor 210 and/or sensor 212 that is used can depend or be selected (for example, by the UAV 200) based on the particular altitude range 108, 110, or 112. In particular, each altitude range 108, 110, and 112 is associated with a particular detection zone 114, 116, and 118, respectively. As shown, altitude range 108 is the lowest range (closest to the pipeline 102) with the smallest detection zone 114, altitude range 110 is the middle range with the medium detection zone 116; and altitude range 112 is the highest altitude range (furthest from the pipeline 102) with the largest detection zone 118. Although three altitude ranges 108, 110, and 112 are shown in this example, fewer or more altitude ranges can also be implemented within the pipeline inspection system 100.

As will be appreciated, the higher the altitude range, the larger the associated detection zone in which the leak 106 can be detected by one or more hydrocarbon sensors 210 and/or one or more optical sensors 212. Further, it will be appreciated that each sensor 210 and/or 212 has its own detection limit, sensitivity, working time, and needed computational power. Example implementations of the pipeline inspection system 100, therefore, maximize operational efficiency of the UAV 200 to enable the sensors 210 and 212 to efficiently work to detect the leak 106 (in other words, most accurately and quickly detect leak 106 while minimizing the consumption of power and computational resources of the UAV 200).

Moreover, this optimal operational efficiency can prioritize finding the leak 106 before quantifying the leak 106. Through this prioritization scheme and the use of multiple (two or more) altitude ranges, the UAV 200 can operate in a scheme in which once the leak 106 is initially detected by a particular sensor 210 and/or 212, the UAV 200 moves to a different altitude range and/or utilizes a different particular sensor 210 and/or 212 to quantify or confirm the leak 106. In this manner, a detection threshold of certain sensor 210 and/or 212 can be increased by adjusting (increasing a size of) the particular detection zone associated with the altitude range in which the UAV 200 is traveling. In an example, while a hydrocarbon sensor 210 such as the gas sniffer can operate at a particular threshold accuracy in detection zone 118 of the altitude range 112, this accuracy could be increased by moving the UAV 200 to the altitude range 110 and into detection zone 116. As another example, while an optical sensor 212 such as the LiDAR can operate at a particular threshold range in detection zone 114 of the altitude range 108, this range could be increased by moving the UAV 200 to the altitude range 112 and into detection zone 118.

The operational optimization of the UAV 200 within the airspace 101 amongst the different altitude ranges 108, 110, and 112 can take into account at least three factors: accuracy, efficiency and cost. To achieve high accuracy without decreasing the efficiency nor increasing the cost, a gate process can be utilized by the UAV 200/control system 999, where a gate can be considered to be a particular threshold that, when met, causes the UAV 200 to move to a different altitude range in the airspace 101 to detect, confirm, and/or quantify the leak 106. In an example process, there can be four gates in which each gate is more accurate in detecting leaks but at the same time, the subsequent gate represents a larger consumption of power and computational resources by the UAV 200 relative to the previous gate. To save or maximize such resources, rather than choosing a sensor or multiple sensors that work at the same time, the operation of sensors 210 and 212 can be divided amongst or between the multiple gates to increase the efficiency and reduce cost without affecting the accuracy of detecting the leak 106. In some aspects, meeting the threshold of one gate and moving to another gate is accompanied by a change in altitude range and a change of sensor operation (for example, from one particular sensor 210 or 212 to another particular sensor 210 or 212). In some aspects, meeting the threshold of one gate and moving to another gate is accompanied only by a change in altitude range and not a change of sensor operation. In some aspects, meeting the threshold of one gate and moving to another gate is accompanied only by a change in sensor operation and not a change of altitude range.

As an example of the gate process, the UAV 200 can begin by traveling in the airspace 101 above the pipeline 102 in altitude range 112 until the leak 106 is initially detected, such as by high definition RGB camera and/or the gas sniffer. Upon detection, a first gate is passed, and the UAV 200 moves down to altitude range 110 (closer to the pipeline 102) to further detect, confirm, and/or quantify the leak 106. The UAV 200 can then use the IR cameras to confirm the leak 106 with thermal imagery (and add such data to the sensor data collected in the first gate). Upon confirmation, a second gate is passed, and the UAV 200 can remain at the altitude range 110 but use the LiDAR sensor to measure a distance to the leak 106 from the UAV 200. Upon collection of this LiDAR data (and adding it to the previous collected data), a second gate is passed, and the UAV 200 can be moved to altitude range 108 (closest to the pipeline 102). Laser fluorosensors can then be used to quantify the leak 106 (for example, amount and/or type of leaked fluid). The collected data within the gates can, in some aspects, be communicated to the control system 999, which can take further action as needed and described herein.

Figure 3:
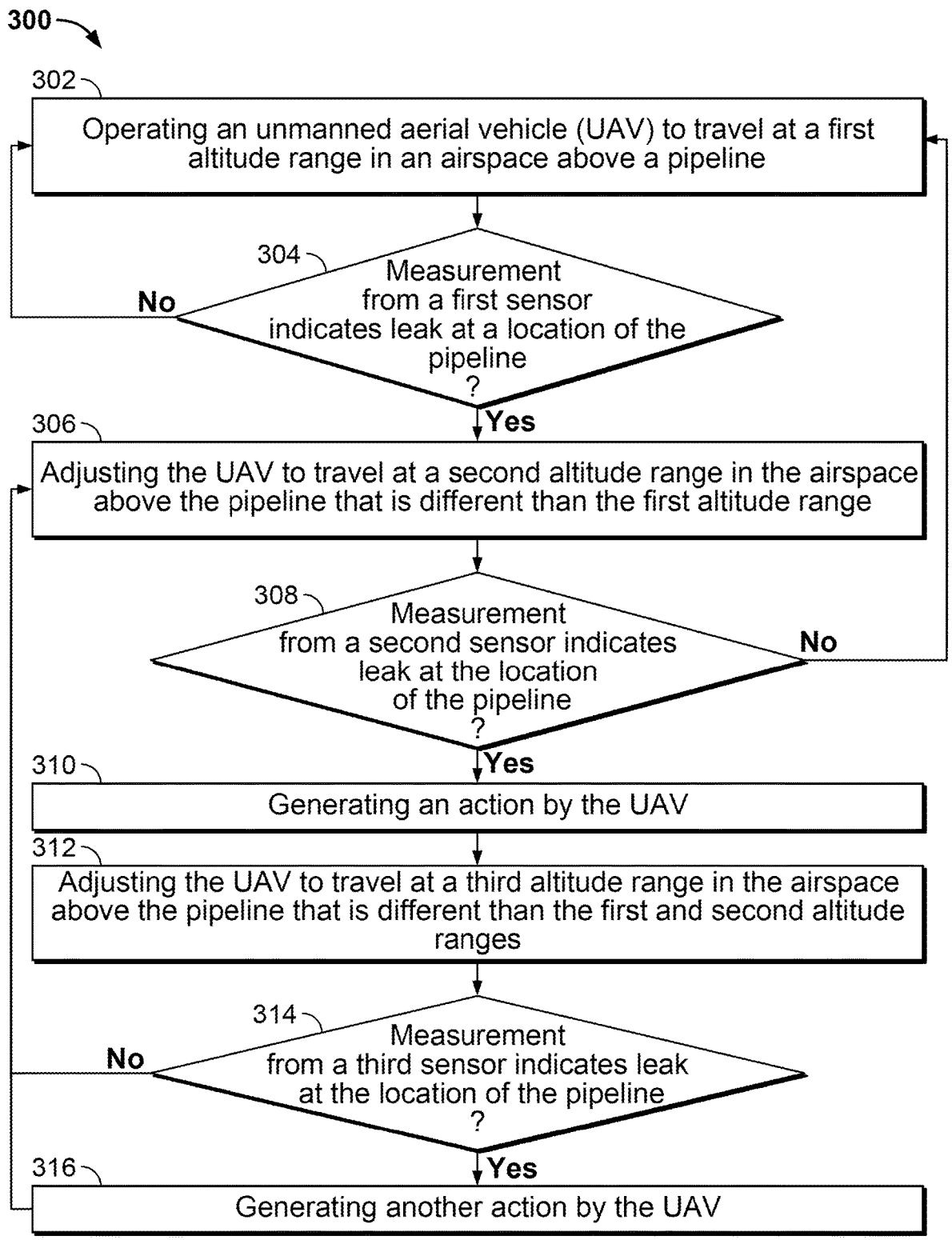
FIG. 3 is a flowchart that illustrates an example method of inspecting a pipeline according to the present disclosure.

FIG. 3 is a flowchart that illustrates an example method 300 of inspecting a pipeline according to the present disclosure. Method 300 can be performed by or with the pipeline inspection system 100 shown in FIG. 1. In some aspects, certain steps of method 300 may be attributed to the control system 999, while certain steps may be attributed to the UAV 200 (or the controller 204). However, these attributions are just examples and steps can be performed with either (or both) of the control system 999 or UAV 200 as appropriate. Indeed, some implementations of the pipeline inspection system 100 do not include control system 999 and all processing functionality and operations can be performed with or by the controller 204. Further, actions or steps taken by a single UAV in method 300 can be performed (in series or parallel) by multiple UAVs according to the present disclosure.

Method 300 can be begin at step 302, which includes operating an unmanned aerial vehicle (UAV) to travel at a first altitude range in an airspace above a pipeline. For example, a UAV 200 can be operated to travel in airspace 101 at, for example, altitude range 112 above the pipeline 102. The UAV 200 can travel in parallel to or perpendicular with the pipeline 102, as well as in other configurations in airspace 101 above the pipeline 102. While traveling in the altitude range 112, the UAV 200 can take sensor measurements in the detection zone 118.

Method 300 can continue at step 304, which includes a determination of whether a measurement from a first sensor indicates a leak at a location of the pipeline. For example, the UAV 200 can operate a hydrocarbon sensor 210 or an optical sensor 212 to detect a leak of hydrocarbon fluid 104 in the pipeline 102. In some aspects, at altitude range 112, the UAV 200 can operate a high definition RGB camera as an optical sensor 212 to detect a leak. In some aspects, at altitude range 112, the UAV 200 can operate a gas sniffer as a hydrocarbon sensor 210 to detect a leak. In some aspects, both the RGB camera and a gas sniffer can operate as sensors 212 and 210, respectively, to detect a leak in the pipeline 102 while the UAV 200 is traveling in the airspace 101 at altitude range 112. Measurements or images taken by sensors 210 and/or 212 can be communicated to the control system 999 (for example, through communication module 206).

If the determination is no (in other words, the first sensor does not detect a leak of hydrocarbon fluid 104 from the pipeline 102), then method 300 can continue at step 302, where the UAV 200 continues to travel above the pipeline 102 in altitude range 112. However, if the determination is yes (in other words, the first sensor detects a leak 106 of hydrocarbon fluid 104 from the pipeline 102), then method 300 can continue at step 306, which includes adjusting the UAV to travel at a second altitude range in the airspace above the pipeline that is different than the first altitude range. For example, UAV 200 can be commanded or instructed by the control system 999, which can make the determination that there is a leak 106, to adjust to altitude range 110 from altitude range 112. Alternatively, the controller 204 of the UAV 200 can adjust the UAV 200 to altitude range 110 (either commanded by the control system 999 or by its own determination that there is a leak 106).

Method 300 can continue at step 308, which includes a determination of whether a measurement from a second sensor indicates the leak at the location of the pipeline. For example, the UAV 200 can operate a different hydrocarbon sensor 210 or a different optical sensor 212 than the sensor 210 or sensor 212 operated in step 304 to further confirm or detect the leak 106 of hydrocarbon fluid 104 in the pipeline 102. In some aspects, at altitude range 110, the UAV 200 can operate a thermal image (IR) camera as an optical sensor 212 to confirm the leak 106. In some aspects, at altitude range 110, the UAV 200 can operate another hydrocarbon sensor 210 to confirm the leak 106. In some aspects, both the IR camera and a hydrocarbon detector can operate as sensors 212 and 210, respectively, to confirm the leak 106 in the pipeline 102 while the UAV 200 is traveling in the airspace 101 at altitude range 110. Measurements or images taken by sensors 210 and/or 212 can be communicated to the control system 999 (for example, through communication module 206) in step 310.

If the determination is no (in other words, the second sensor does not confirm or detect the leak 106 of hydrocarbon fluid 104 from the pipeline 102), then method 300 can continue at step 302, where the UAV 200 is adjusted back to travel above the pipeline 102 in altitude range 112. However, if the determination is yes (in other words, the second sensor confirms or detects the leak 106 of hydrocarbon fluid 104 from the pipeline 102), then method 300 can continue at step 310, which includes generating an action by the UAV. For example, the UAV 200, based on the measurements of steps 304 and 308, can generate or provide an alert that is an indication of the leak 106 to the control system 999. In response, the control system 999 can, for example, alert an operator. In some aspects, the generated alert also includes the sensed data and/or captured images from the UAV 200.

Method 300 can continue at step 312, which includes adjusting the UAV to travel at a third altitude range in the airspace above the pipeline that is different than the first and second altitude ranges. For example, UAV 200 can be commanded or instructed by the control system 999, which can make the confirmation that there is the leak 106, to adjust to altitude range 108 from altitude range 110. Alternatively, the controller 204 of the UAV 200 can adjust the UAV 200 to altitude range 108 (either commanded by the control system 999 or by its own confirmation that there is the leak 106).

Method 300 can continue at step 314, which includes a determination of whether a measurement from a third sensor indicates the leak at the location of the pipeline. For example, the UAV 200 can operate another, different hydrocarbon sensor 210 or another, different optical sensor 212 than the sensor 210 or sensor 212 operated in steps 304 and 308 to further confirm or quantify the leak 106 of hydrocarbon fluid 104 in the pipeline 102. In some aspects, at altitude range 108, the UAV 200 can operate a LiDAR sensor as an optical sensor 212, or another hydrocarbon sensor 210, to confirm or quantify the leak 106. Measurements or images taken by sensors 210 and/or 212 can be communicated to the control system 999 (for example, through communication module 206) in step 314.

If the determination is no (in other words, the third sensor does not confirm or quantify the leak 106 of hydrocarbon fluid 104 from the pipeline 102), then method 300 can continue at step 302, where the UAV 200 is adjusted back to travel above the pipeline 102 in altitude range 112. Further, in some aspects, even if the LiDAR sensor does not confirm or quantify the leak 106, the UAV 200 can provide a location of the potential or detected leak 106 (for example, through GPS module 208), either before or after adjusting to altitude range 112.

However, if the determination is yes (in other words, the third sensor confirms or quantifies the leak 106 of hydrocarbon fluid 104 from the pipeline 102), then method 300 can continue at step 316, which includes generating another action by the UAV 200. For example, the UAV 200, based on the measurements of steps 304, 308, and 310 can then even utilize a fourth sensor at altitude range 108 to further quantify the leak 106. For example, a laser fluorosensor can be used as hydrocarbon sensor 210 to further quantify, for example, an amount or type of hydrocarbon fluid 104 in the leak 106. Further, in some aspects, the action of step 316 can provide images of the leak 106, for example, to the control system 999. As another example, the action taken in step 316 can include, for example, the control system 999 providing a command or signal to shut down the pipeline 102 so that the leak 106 will not spread. After step 316, method 300 can, for example, proceed by moving the UAV 200 back to altitude range 110 and marking a GPS location of the leak 106 and then returning to altitude range 112.

As previously noted, more than one UAV 200 can be used in method 300. For example, in some aspects, multiple UAVs 200 can be operated simultaneously in the steps of method 300, either at the same altitude range or different altitude ranges. Thus, in some aspects, multiple UAVs 200 can be operating in multiple, different altitude ranges with multiple, different hydrocarbon sensors 210 and/or optical sensors 212 to detect, confirm, and quantify the leak 106.

FIG. 4 is a schematic illustration of an example controller 400 (or control system) for controlling operations of a pipeline inspection system according to the present disclosure. For example, the controller 400 may include or be part of the control system 999 shown in FIG. 1 for the pipeline inspection system 100. The controller 400 is intended to include various forms of digital computers, such as printed circuit boards (PCB), processors, digital circuitry, or otherwise parts of a biocide testing system. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A pipeline inspection method, comprising:
    operating at least one unmanned aerial vehicle (UAV) in an airspace above a pipeline configured to transport a hydrocarbon fluid, the at least one UAV comprising:
        at least one power source configured to provide power to the at least one UAV, and
        a plurality of sensors configured to detect a leak of the hydrocarbon fluid from the pipeline; and
    commanding the at least one UAV to travel at a first altitude range in the airspace above a first detection zone of the pipeline;
    identifying a measurement, taken at the first altitude range, from a high definition camera or gas sniffer that indicates a location of a potential leak of the hydrocarbon fluid from the pipeline;
    based on the identified measurement from the high definition camera or gas sniffer, commanding the at least one UAV to descend from the first altitude range to a second altitude range and travel at the second altitude range lower than the first altitude range in the airspace above a second detection zone of the pipeline to confirm the location of the potential leak and a presence of the potential leak of the hydrocarbon fluid;
    identifying a measurement, taken at the second altitude range, from an infrared camera;
    confirming, based on the measurement taken at the second altitude range from the infrared camera, the location and the presence of the potential leak of the hydrocarbon fluid from the pipeline;
    based on the identified measurement from the infrared camera, operating a LiDAR sensor to measure a distance between the potential leak of the hydrocarbon fluid and the at least one UAV;
    based on the identified measurement from the infrared camera, commanding the at least one UAV to descend from the second altitude range to a third altitude range and travel at the third altitude range lower than the first and second altitude ranges in the airspace above a third detection zone of the pipeline;
    identifying a measurement, taken at the third altitude range, from a laser fluorosensor, that quantifies the potential leak of the hydrocarbon fluid from the pipeline; and
    generating a recommended action based on at least one of the identified measurements.

2. The method of claim 1, wherein the second altitude range is at least 1000 feet lower than the first altitude range.

3. The method of claim 1, wherein the third altitude range is at least 800 feet lower than the first and second altitude ranges.

4. The method of claim 1, further comprising:
    identifying a measurement, taken at the third altitude range, from the laser fluorosensor that indicates the location of the potential leak of the hydrocarbon fluid from the pipeline.

5. The method of claim 4, wherein generating the recommended action based on at least one of the identified measurements comprises at least one of:
    generating an alert associated with the location of the potential leak of the hydrocarbon fluid;
    geolocating the location of the potential leak of the hydrocarbon fluid based on the identified measurement from the LiDAR sensor; or
    confirming the presence of leaked hydrocarbons at the location based on the identified measurement from the laser fluorosensor.

6. The method of claim 5, wherein generating the recommended action based on at least one of the identified measurements comprises:
    generating an alert associated with the location of the potential leak of the hydrocarbon fluid;
    geolocating the location of the potential leak of the hydrocarbon fluid based on the identified measurement from the LiDAR sensor; and
    confirming the presence of leaked hydrocarbons at the location based on the identified measurement from the laser fluorosensor.

7. The method of claim 1, wherein the at least one UAV comprises a first UAV and a second UAV, and the method further comprise:
    commanding the first UAV to travel at the first altitude range in the airspace above the pipeline;
    identifying a measurement, taken at the first altitude range, from a first sensor of the plurality of sensors of the first UAV that indicates a first location of a potential leak of the hydrocarbon fluid from the pipeline;
    commanding the second UAV to travel at the second altitude range different from the first altitude range in the airspace above the pipeline;
    identifying a measurement, taken at the second altitude range, from a second sensor of the plurality of sensors of the second UAV that indicates a second location of the potential leak of the hydrocarbon fluid from the pipeline; and
    operating at least one of the first or second UAVs to reconcile the first and second locations.

8. The method of claim 7, wherein operating at least one of the first or second UAVs to reconcile the first and second locations comprises:
    commanding at least one of the first or second UAVs to travel at the third altitude range above the pipeline; and
    identifying a measurement, taken at the third altitude range, from a third sensor of the plurality of sensors that indicates the location of the potential leak of the hydrocarbon fluid from the pipeline of the first or second locations.

9. The method of claim 1, wherein the second detection zone is smaller than the first detection zone.

10. The method of claim 9, wherein the third detection zone is smaller than the second detection zone.

11. The method of claim 1, wherein the third detection zone is smaller than the second detection zone.

12. A pipeline inspection system, comprising:
at least one unmanned aerial vehicle (UAV) operable to travel in an airspace above a pipeline configured to transport a hydrocarbon fluid, the at least one UAV comprising:
at least one power source configured to provide power to the at least one UAV,
a plurality of sensors configured to detect a leak of the hydrocarbon fluid from the pipeline, and
a communication module; and
a control system communicably coupled with the communication module of the at least one UAV and configured to perform operations comprising:
operating the at least one UAV to travel at a first altitude range in the airspace above a first detection zone of the pipeline,
identifying a measurement, taken at the first altitude range, from a high definition camera or gas sniffer that indicates a location of a potential leak of the hydrocarbon fluid from the pipeline,
based on the identified measurement from the high definition camera or gas sniffer, operating the at least one UAV to descend from the first altitude range to a second altitude range and travel at the second altitude range lower than the first altitude range in the airspace above a second detection zone of the pipeline to confirm the location of the potential leak and a presence of the potential leak of the hydrocarbon fluid,
identifying a measurement, taken at the second altitude range, from an infrared camera,
confirming, based on the measurement taken at the second altitude range from the infrared camera, the location and the presence of the potential leak of the hydrocarbon fluid from the pipeline,
based on the identified measurement from the infrared camera, operating a LIDAR sensor to measure a distance between the potential leak of the hydrocarbon fluid and the at least one UAV,
based on the identified measurement from the infrared camera, operating the at least one UAV to descend from the second altitude range to a third altitude range and travel at the third altitude range lower than the second altitude range in the airspace above a third detection zone of the pipeline to quantify the potential leak of the hydrocarbon fluid,
identifying a measurement, taken at the third altitude range, from a laser fluorosensor, that quantifies the potential leak of the hydrocarbon fluid, and
generating a recommended action based on at least one of the identified measurements.

13. The pipeline inspection system of claim 12, wherein the second altitude range is at least 1,000 feet lower than the first altitude range.

14. The pipeline inspection system of claim 13, wherein the third altitude range is at least 800 feet lower than the first and second altitude ranges.

15. The pipeline inspection system of claim 12, wherein the operations further comprise:
identifying a measurement, taken at the third altitude range, from the LiDAR sensor, that indicates the location of the potential leak of the hydrocarbon fluid from the pipeline.

16. The pipeline inspection system of claim 15, wherein the operation of generating the recommended action based on at least one of the identified measurements comprises at least one of:
generating an alert associated with the location of the potential leak of the hydrocarbon fluid,
geolocating the location of the potential leak of the hydrocarbon fluid based on the identified measurement from the infrared camera, or
confirming the presence of leaked hydrocarbons at the location based on the identified measurement from the LiDAR sensor.

17. The pipeline inspection system of claim 12, wherein the at least one UAV comprises a first UAV and a second UAV, and the operations further comprise:
operating the first UAV to travel at the first altitude range in the airspace above the pipeline,
identifying a measurement, taken at the first altitude range, from a first sensor of the plurality of sensors of the first UAV that indicates a first location of a potential leak of the hydrocarbon fluid from the pipeline,
operating the second UAV to travel at the second altitude range different from the first altitude range in the airspace above the pipeline,
identifying a measurement, taken at the second altitude range, from a second sensor of the plurality of sensors of the second UAV that indicates a second location of the potential leak of the hydrocarbon fluid from the pipeline, and
operating at least one of the first or second UAVs to reconcile the first and second locations.

18. The pipeline inspection system of claim 17, wherein the operation of operating at least one of the first or second UAVs to reconcile the first and second locations comprises:
operating at least one of the first or second UAVs to travel at the third altitude range above the pipeline, and
identifying a measurement, taken at the third altitude range, from the third sensor of the plurality of sensors that indicates the location of the potential leak of the hydrocarbon fluid from the pipeline of the first or second locations.

19. The pipeline inspection system of claim 12, wherein the second detection zone is smaller than the first detection zone.

20. The pipeline inspection system of claim 19, wherein the third detection zone is smaller than the second detection zone.

21. The pipeline inspection system of claim 12, wherein the third detection zone is smaller than the second detection zone.

* * * * *